United States Patent
Hamasaki et al.

(10) Patent No.: US 8,830,623 B2
(45) Date of Patent: Sep. 9, 2014

(54) SHIELD STRUCTURE FOR REDUCING THE MAGNETIC INDUCTION RATE OF THE TRAILING SHIELD AND SYSTEMS THEREOF

(75) Inventors: Tomoaki Hamasaki, Yokohama (JP); Hiroyuki Katada, Odawara (JP); Isao Nunokawa, Odawara (JP); Kimitoshi Etoh, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/330,570

(22) Filed: Dec. 19, 2011

(65) Prior Publication Data
US 2013/0155544 A1 Jun. 20, 2013

(51) Int. Cl.
*G11B 5/127* (2006.01)
*G11B 5/31* (2006.01)

(52) U.S. Cl.
CPC .................................. *G11B 5/3116* (2013.01)
USPC ........................................................ 360/110

(58) Field of Classification Search
None
See application file for complete search history.

(56) References Cited

U.S. PATENT DOCUMENTS

| | | | |
|---|---|---|---|
| 7,359,146 B2 | 4/2008 | Hirata et al. | |
| 7,788,797 B2 | 9/2010 | Kim et al. | |
| 2005/0111138 A1 | 5/2005 | Yamakawa et al. | |
| 2006/0158780 A1 | 7/2006 | Lee et al. | |
| 2007/0115584 A1 | 5/2007 | Balamane et al. | |
| 2008/0088972 A1 | 4/2008 | Sasaki et al. | |
| 2008/0112081 A1 | 5/2008 | Matono | |
| 2008/0259498 A1 | 10/2008 | Lengsfield et al. | |
| 2008/0278861 A1 | 11/2008 | Jiang et al. | |
| 2008/0278862 A1 | 11/2008 | Kameda et al. | |
| 2008/0316642 A1* | 12/2008 | Yamaguchi et al. | 360/110 |
| 2009/0002885 A1 | 1/2009 | Sin | |
| 2009/0152119 A1 | 6/2009 | Tachibana et al. | |
| 2009/0154009 A1* | 6/2009 | Le | 360/110 |
| 2009/0166210 A1* | 7/2009 | Bonhote et al. | 205/157 |
| 2009/0168240 A1* | 7/2009 | Hsiao et al. | 360/125.02 |
| 2010/0163422 A1* | 7/2010 | Hsiao et al. | 205/122 |
| 2010/0165517 A1 | 7/2010 | Araki et al. | |
| 2011/0007428 A1 | 1/2011 | Batra et al. | |
| 2011/0147222 A1* | 6/2011 | Pentek et al. | 205/170 |

FOREIGN PATENT DOCUMENTS

| | | |
|---|---|---|
| JP | 2007/294078 | 11/2007 |
| JP | 2009/048719 A | 3/2009 |
| JP | 2009/151861 A | 7/2009 |
| KR | 2009/0050745 A | 5/2009 |

* cited by examiner

*Primary Examiner* — David D Davis
(74) *Attorney, Agent, or Firm* — Zilka-Kotab, PC

(57) ABSTRACT

In one embodiment, a magnetic head includes a main magnetic pole, a trailing shield positioned on a trailing side of the main magnetic pole, a trailing gap positioned between the trailing shield and the main magnetic pole, side shields positioned on either side of the main magnetic pole in a cross-track direction, side gaps positioned between the side shields and the main magnetic pole on either side of the main magnetic pole in the cross-track direction, and trailing shield gaps positioned on either side of the main magnetic pole in the cross-track direction between the trailing shield and the side shields, wherein the trailing shield gaps extend beyond the side gaps in a direction parallel to the cross-track direction. In addition, a method for producing a magnetic head as described above is also disclosed, according to one embodiment.

20 Claims, 13 Drawing Sheets

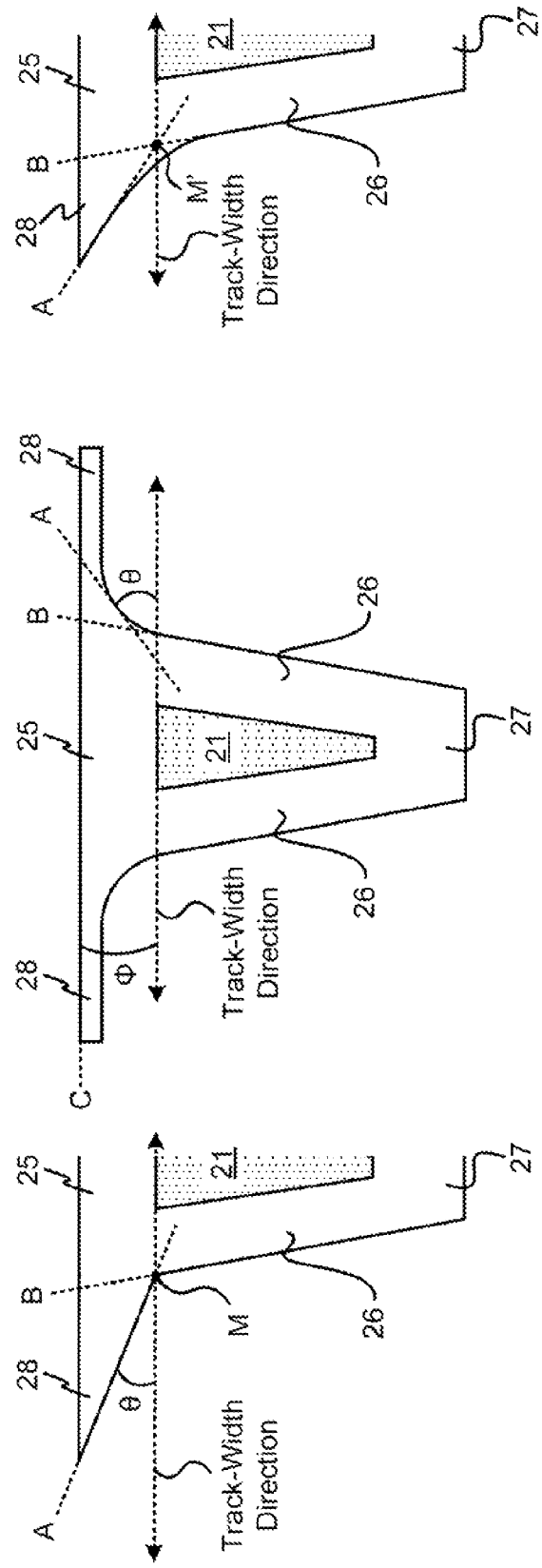

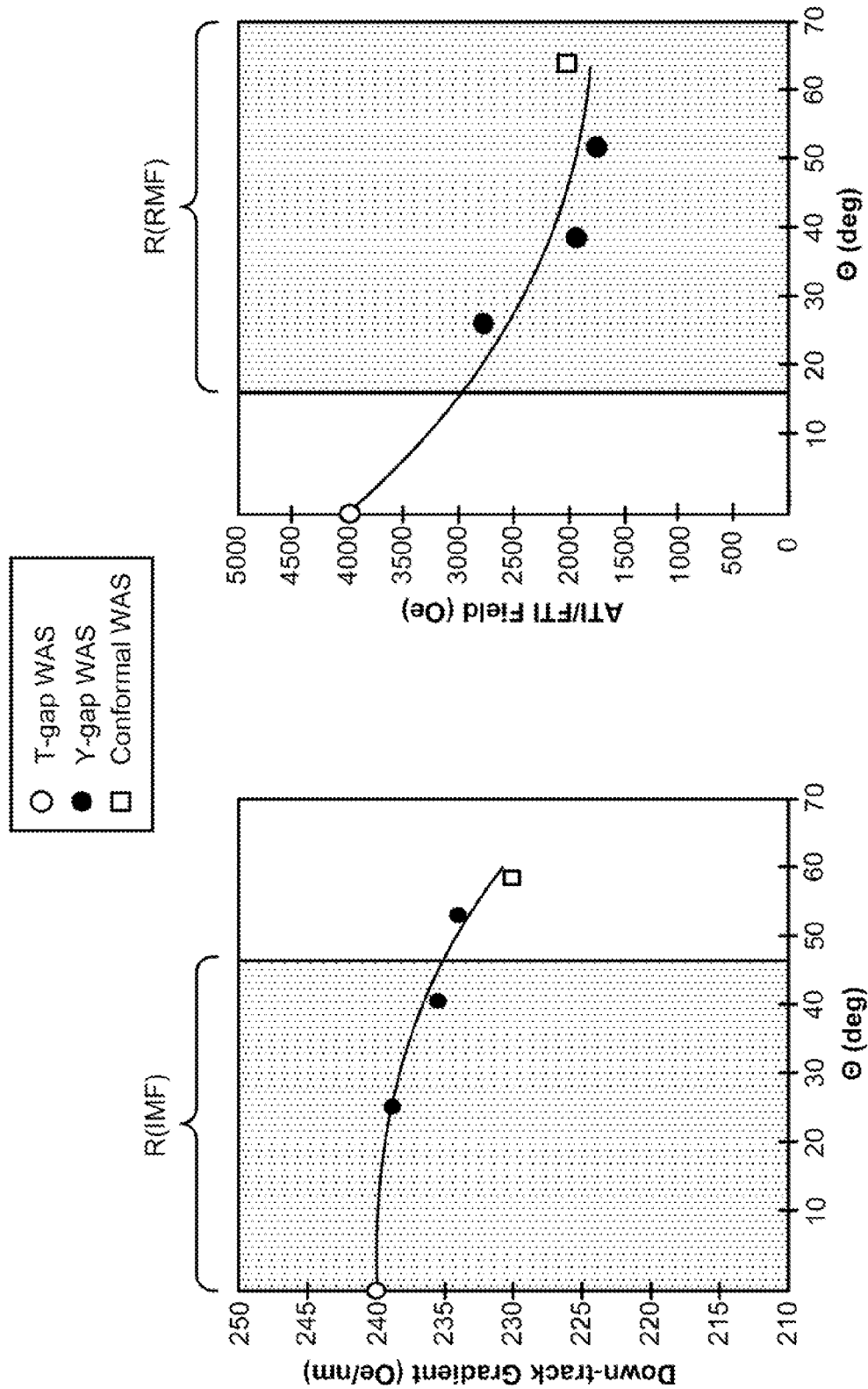

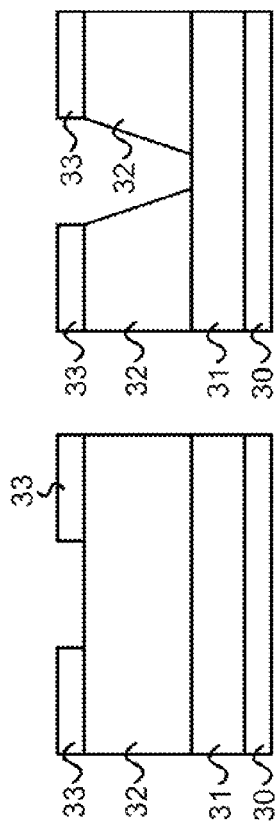
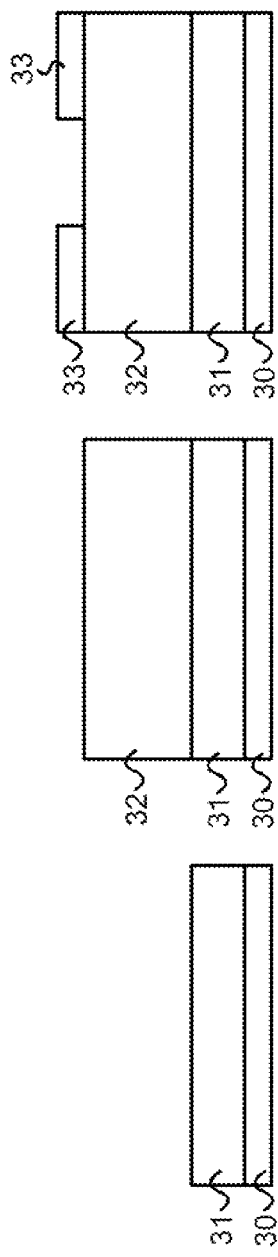
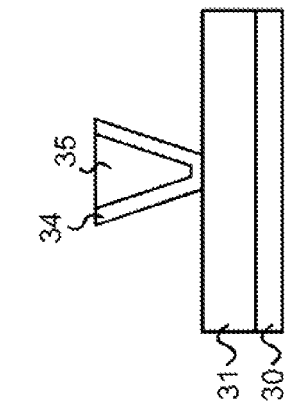
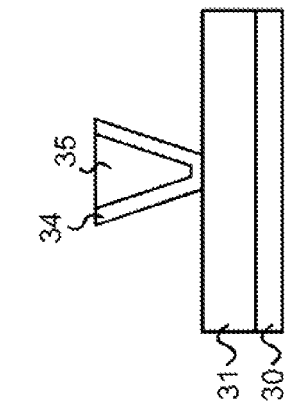
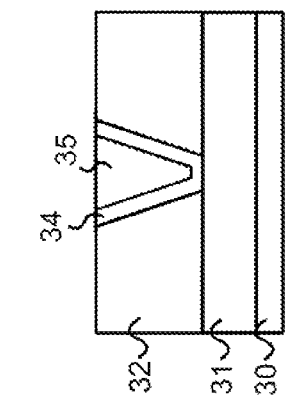
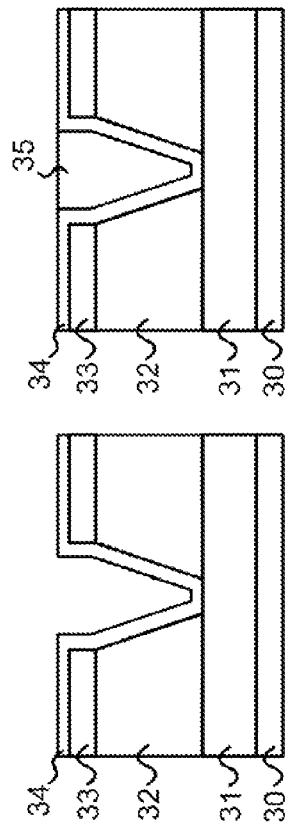

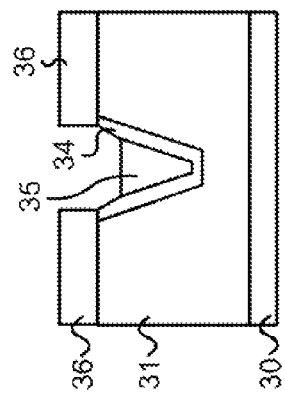
FIG. 18I
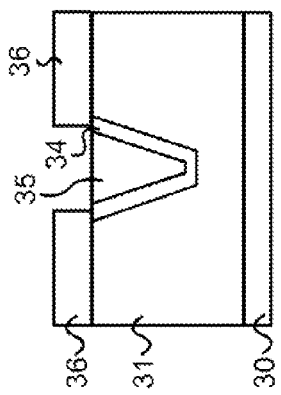
FIG. 18J
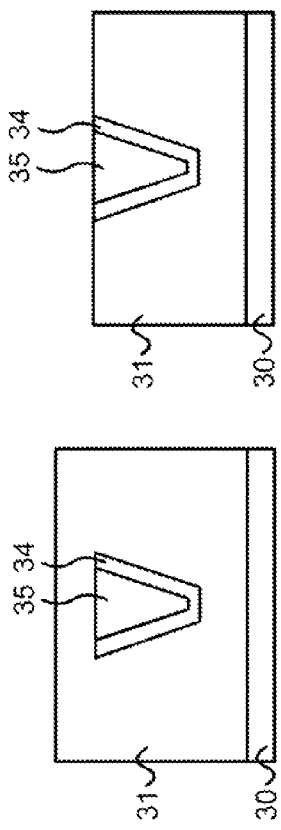
FIG. 18K
FIG. 18L
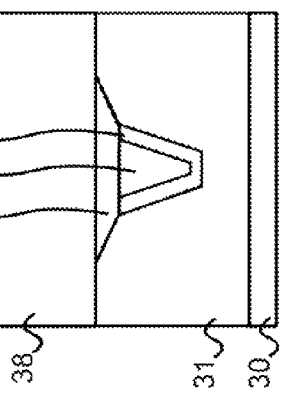
FIG. 18M
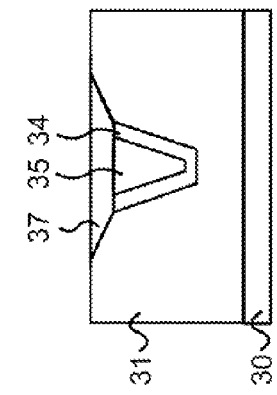
FIG. 18N
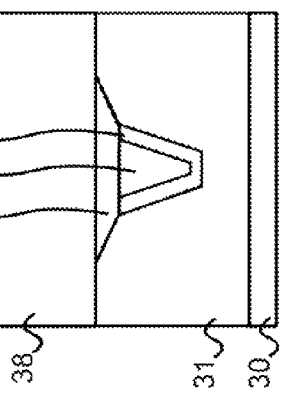
FIG. 18O
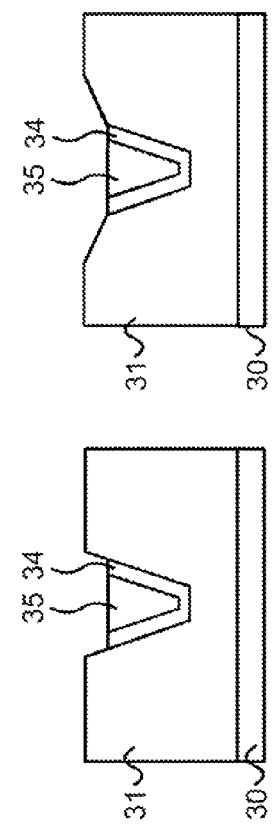
FIG. 18P

SHIELD STRUCTURE FOR REDUCING THE MAGNETIC INDUCTION RATE OF THE TRAILING SHIELD AND SYSTEMS THEREOF

FIELD OF THE INVENTION

The present application relates to a magnetic head having a shield structure around the main pole which reduces the induction rate of the trailing magnetic shield.

BACKGROUND

In order to produce high recording density on a hard disk and to improve the linear recording density, it is useful to increase the magnetic field gradient in the down-track direction (head scanning direction), thereby allowing the surface density produced by narrower tracks to be increased. The effects are that the down-track magnetic field gradient is increased by providing a trailing shield at the main magnetic pole, and the magnetic field leakage of the recording magnetic field to adjacent tracks is reduced by providing side shields. A wrap around shield (WAS) structure that has a trailing shield and side shields surrounding the main magnetic pole improves the signal-to-noise ratio (SNR) by increasing the down-track magnetic field gradient by using the trailing shield and reducing the effects on adjacent tracks by using the side shields.

The WAS structure described above is defined as a conformal WAS structure. The problems of conformal WAS structures are that the magnetic induction rate is effectively reduced and the magnetic field gradient does not increase when a magnetic wall is generated because the shape of the shield has many angles, as shown in FIG. 5, according to the prior art. The magnetization action of the shield is limited by this magnetic wall. The shield structure considered for solving this problem is the T-gap WAS structure shown in FIG. 6 in which the shield shape near the main magnetic pole places a gap (TS gap) between the trailing shield and the side shields. The magnetic wall is generated from a position separated from the main magnetic pole by this TS gap. The effective magnetic induction rate is improved by widening the region in which the magnetization tilts. Although the effects of using this T-gap WAS structure are an increased magnetic field gradient and a higher SNR, the problem of information erasure (ATI/FTI) in nearby tracks arises due to the difficulty in generating closure domains near the angle members at the trailing end of the side shields indicated by circles in FIG. 6, and the generation of the magnetic field leakage at locations where the magnetic load is concentrated.

SUMMARY

In one embodiment, a magnetic head includes a main magnetic pole, a trailing shield positioned on a trailing side of the main magnetic pole, a trailing gap positioned between the trailing shield and the main magnetic pole, side shields positioned on either side of the main magnetic pole in a cross-track direction, side gaps positioned between the side shields and the main magnetic pole on either side of the main magnetic pole in the cross-track direction, and trailing shield gaps positioned on either side of the main magnetic pole in the cross-track direction between the trailing shield and the side shields, wherein the trailing shield gaps extend beyond the side gaps in a direction parallel to the cross-track direction.

In another embodiment, a method includes depositing a magnetic material as a stopper film above a substrate, forming an insulating material above the stopper film, depositing a hard film above the insulating material, the hard film leaving a portion of the insulating material exposed, forming a groove in the exposed insulating material for use in forming a main magnetic pole, depositing a paramagnetic film in the groove to form side gaps, forming a magnetic material in the groove above the side gaps for use as the main magnetic pole, planarizing an upper surface of the main magnetic pole, the hard film, and the side gaps, removing the insulating layer, plating a magnetic material on sides and above the main magnetic pole, the hard film, and the side gaps to form side shields, planarizing the side shields to a desired position consistent with an upper surface of the side gaps, forming a resist mask above each of the side shields, milling the main magnetic pole to a desired position relative to the side shields, removing the resist mask, removing residual portions of the side gaps that are positioned above an upper surface of the main magnetic pole, removing portions of the side shields on either side of the side gaps for use in forming a trailing shield gaps, depositing an insulating layer above the main magnetic pole, the side gaps, and the side shields where the portions of the side shields have been removed to form a trailing gap and trailing shield gaps, and forming a magnetic material above the side shields, the trailing gap, and the trailing shield gaps to form a trialing shield.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 10 is a schematic view that shows an angle (θ) in the shield structure of FIG. 7 in accordance with one embodiment.

FIG. 11 shows a shield structure of a derivative magnetic head structure, according to one embodiment.

FIG. 12 is a schematic view that shows an angle (θ) in the shield structure of FIG. 11 in accordance with one embodiment.

FIG. 13 shows the dependence on the angle (θ) of the magnetic field gradient of the magnetic head in the down-track direction in the shield structure, according to one embodiment.

FIG. 14 shows a relationship between the angle (θ) and the intensity of the magnetic field leakage generated from the angle members at the trailing end of the side shields in the shield structure, according to one embodiment.

FIGS. 18A-18P show a process flow for realizing a structure of a magnetic head, according to one embodiment.

DETAILED DESCRIPTION

Figure 1:
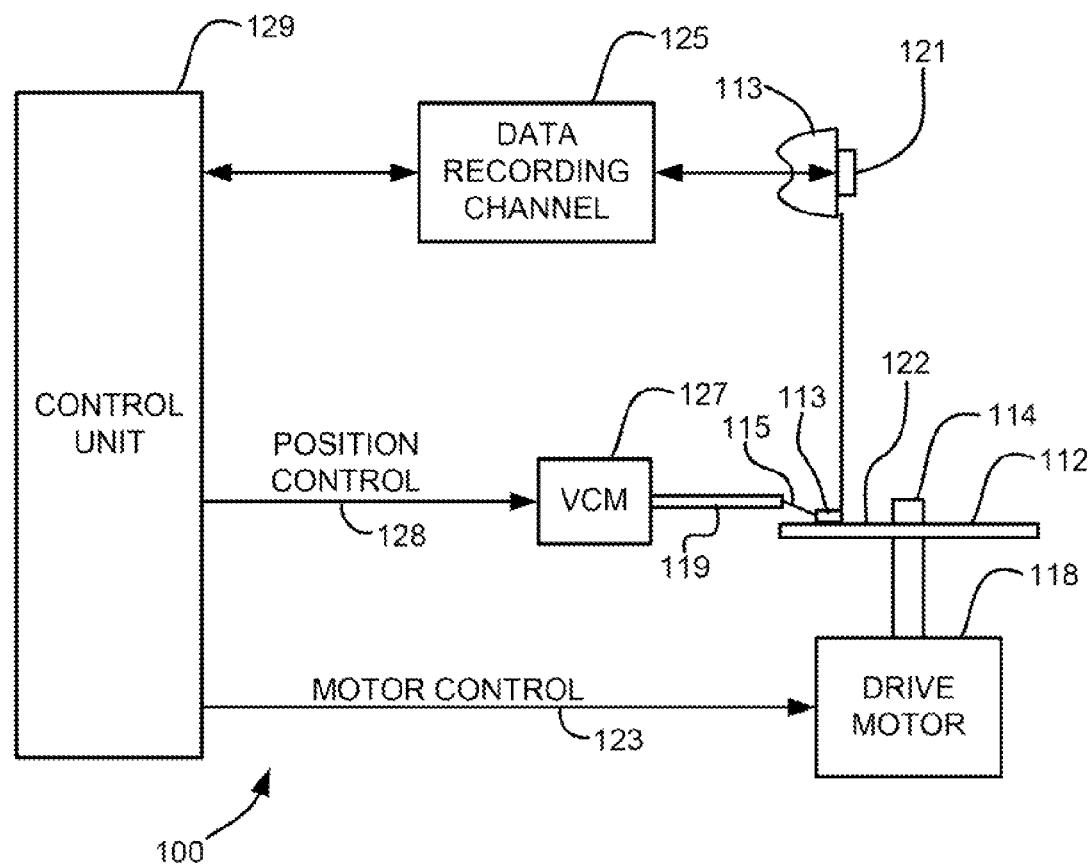
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head includes a main magnetic pole, a trailing shield positioned on a trailing side of the main magnetic pole, a trailing gap positioned between the trailing shield and the main magnetic pole, side shields positioned on either side of the main magnetic pole in a cross-track direction, side gaps positioned between the side shields and the main magnetic pole on either side of the main magnetic pole in the cross-track direction, and trailing shield gaps positioned on either side of the main magnetic pole in the cross-track direction between the trailing shield and the side shields, wherein the trailing shield gaps extend beyond the side gaps in a direction parallel to the cross-track direction.

In another general embodiment, a method includes depositing a magnetic material as a stopper film above a substrate, forming an insulating material above the stopper film, depositing a hard film above the insulating material, the hard film leaving a portion of the insulating material exposed, forming a groove in the exposed insulating material for use in forming a main magnetic pole, depositing a paramagnetic film in the groove to form side gaps, forming a magnetic material in the groove above the side gaps for use as the main magnetic pole, planarizing an upper surface of the main magnetic pole, the hard film, and the side gaps, removing the insulating layer, plating a magnetic material on sides and above the main magnetic pole, the hard film, and the side gaps to form side shields, planarizing the side shields to a desired position consistent with an upper surface of the side gaps, forming a resist mask above each of the side shields, milling the main magnetic pole to a desired position relative to the side shields, removing the resist mask, removing residual portions of the side gaps that are positioned above an upper surface of the main magnetic pole, removing portions of the side shields on either side of the side gaps for use in forming a trailing shield gaps, depositing an insulating layer above the main magnetic pole, the side gaps, and the side shields where the portions of the side shields have been removed to form a trailing gap and trailing shield gaps, and forming a magnetic material above the side shields, the trailing gap, and the trailing shield gaps to form a trialing shield.

Referring now to FIG. 1, there is shown a disk drive 100 in accordance with one embodiment as disclosed herein. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

Figure 2A:
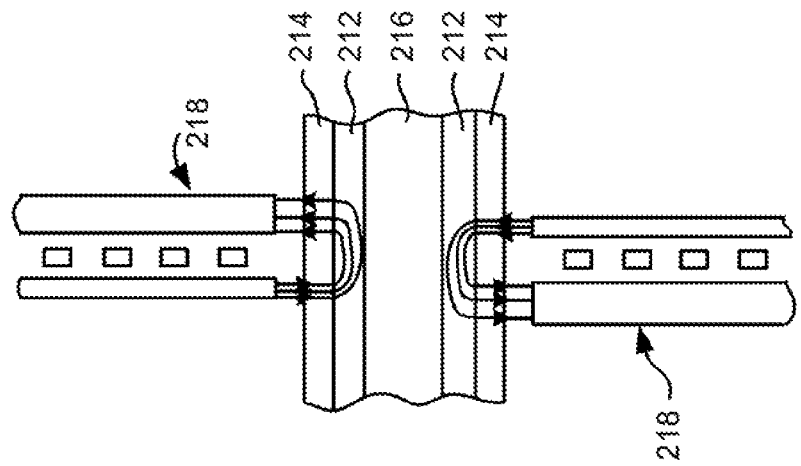
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
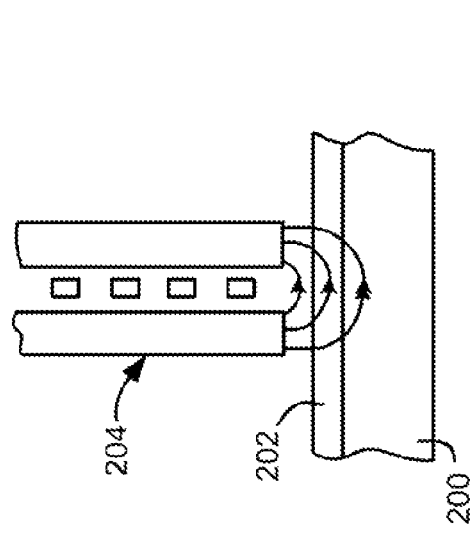
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
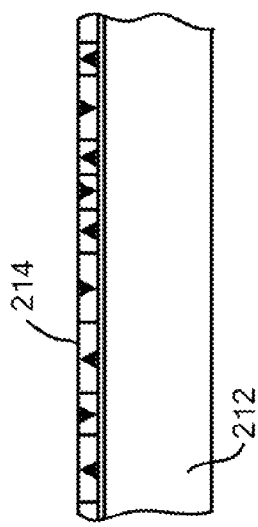
FIG. 2C is a magnetic recording medium utilizing a perpendicular recording format

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
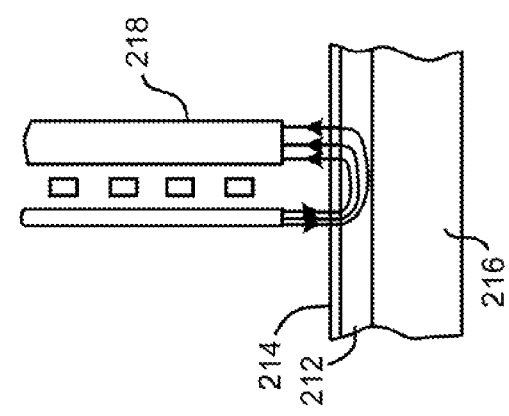
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
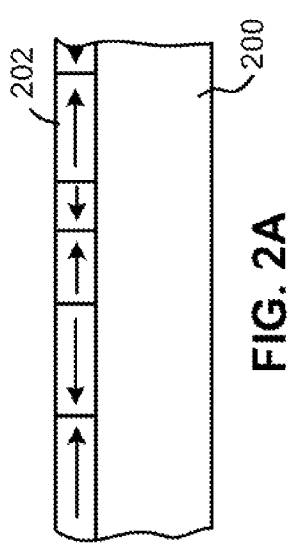
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
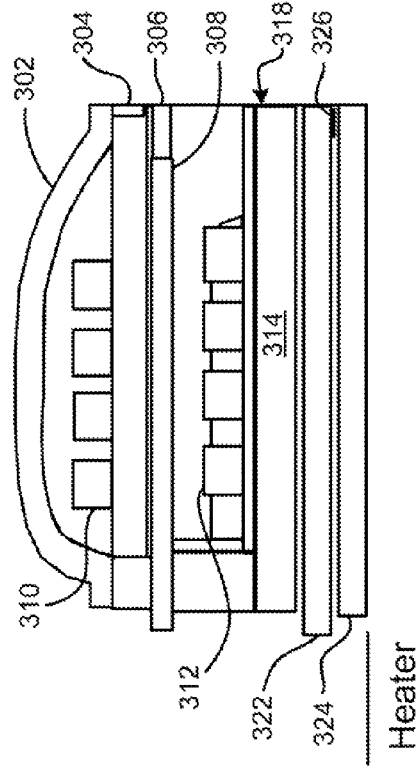
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
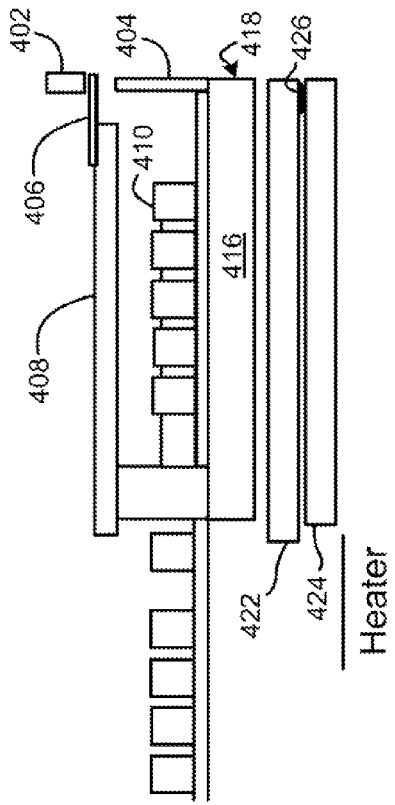
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
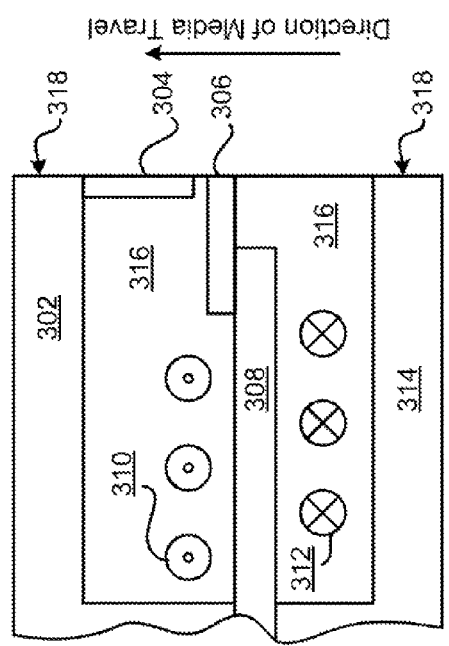
FIG. 4A is a cross-sectional view of one particular embodiment of a perpendicular magnetic head with looped coils.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
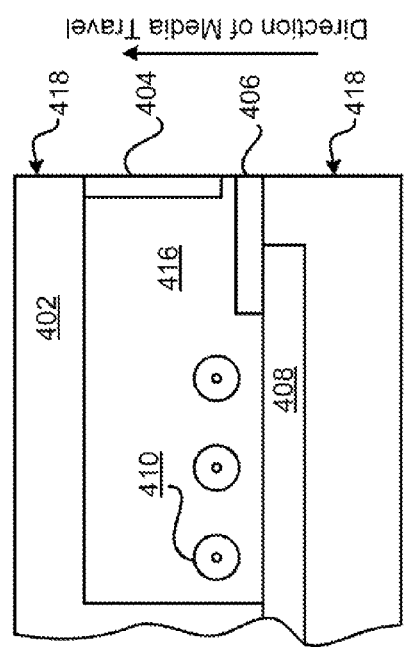
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

According to some embodiments, a shield structure is capable of reducing the magnetic induction rate of the trailing shield by using a magnetic wall while simultaneously suppressing the magnetic field leakage generated from the side shields.

Figure 7:
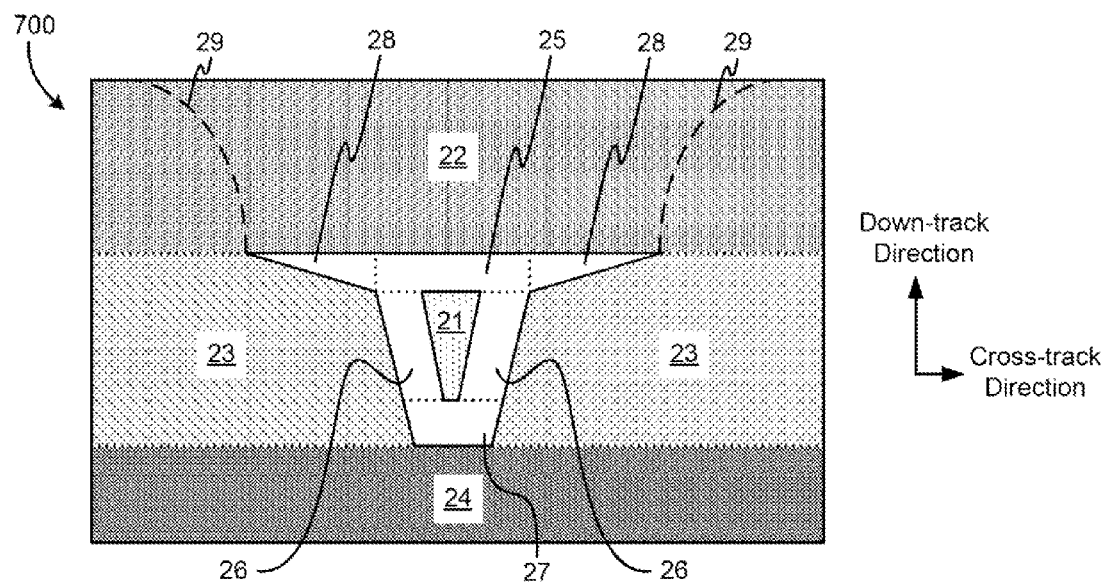
FIG. 7 shows a shield structure of a magnetic head, according to one embodiment.

FIG. 7 shows a shield structure of a magnetic head, according to one embodiment. The shield structure comprises magnetic materials (and possibly non-magnetic materials) layered in a way to surround the main magnetic pole 21. The shield structure has a trailing shield 22 adjacent to the trailing gap 25 directly above the main magnetic pole 21 and side shields 23 adjacent to the side gaps 26 on both sides of the magnetic pole 21. There is a trailing shield (TS) gap 28 for separating the trailing shield 22 and the side shields 23. The TS gap 28 has a finite length in the track-width direction when viewed from a plane opposite the magnetic medium. The trailing shield 22 and the side shields 23 connect outside of the TS gap 28 in the track-width direction when viewed from the main magnetic pole 21. Below the main magnetic pole 21 and the side shields 23, the shield structure may include a leading shield 24 comprising non-magnetic materials or magnetic materials adjacent to the leading gap 27 directly below the main magnetic pole 21. In this case, the side shields 23 and the leading shield 24 may be in contact with one another.

According to one embodiment, the shield shape may have an interval between the trailing shield 22 and the side shields 23 of the TS gap 28 that narrows gradually in the track-width direction away from the main magnetic pole 21 when viewed from the plane opposite the magnetic medium. The shield shape has an edge on the trailing shield 22 side of the TS gap 28 in the direction parallel to the track-width direction and the angle formed between the edge on the side shield 23 and the direction parallel to the track width direction is an angle (θ) in the trailing direction of the magnetic head from the direction parallel to the track-width direction. In other words, a width of each of the TS gaps 28 in a direction perpendicular to the cross-track direction is narrower at a point away from the main magnetic pole 21 than at a point near the main magnetic pole 21, and wherein each of the TS gaps 28 narrow gradually from the point near the main magnetic pole 21 toward the point away from the main magnetic pole 21.

Figure 5:
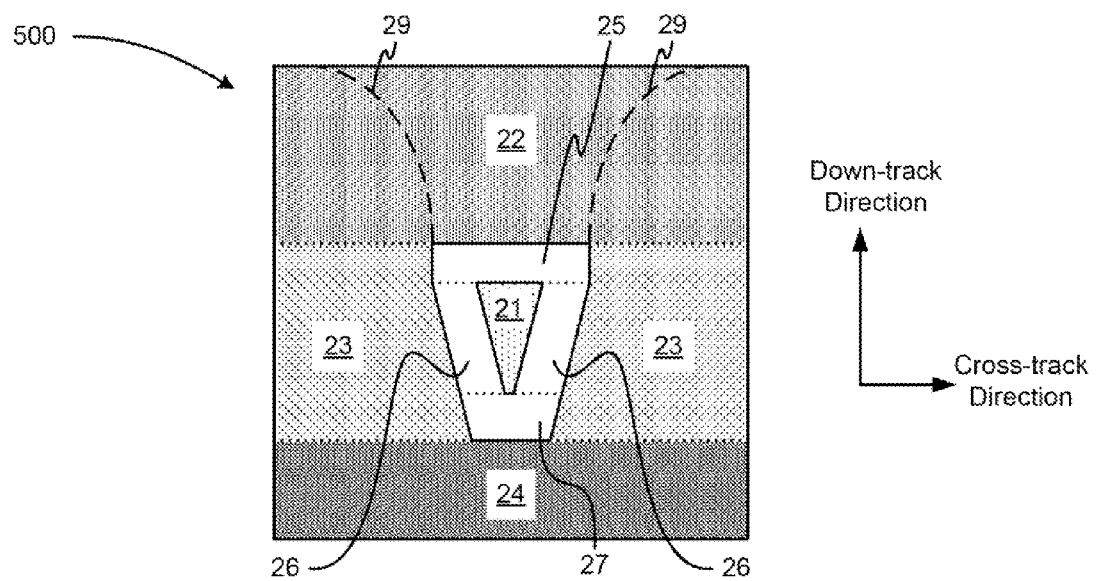
FIG. 5 shows a conformal wrap around shield (WAS) structure of a conventional magnetic head, according to the prior art.

In the conventional conformal wrap around shield (WAS) structure shown in FIG. 5, the magnetic wall is generated from an angle at a position close to the main magnetic pole 21 of the trailing shield 22. The resulting structure has the generation position of the magnetic wall by the TS gap 28 at a distance in the track-width direction from the main magnetic pole, namely, the structure is similar to the T-gap WAS structure shown in FIG. 6. Thus, the effects obtained are an increase in the effective magnetic induction rate by widening the region where the magnetization easily tilts, and an improvement in the signal-to-noise ratio (SNR) by increasing the magnetic field gradient.

According to one embodiment, as shown in FIG. 7, an angle may be formed by the edge on the side shield 23 side of the TS gap 28 and the direction parallel to the track-width direction, angle (θ), in the trailing side direction of the magnetic head. In a structure which comprises this angled structure, the edges of the side shields 23 that are opposite the main magnetic pole 21 and sandwich the side gap 26, and the angles formed by both edges at the trailing end of the side shield 23 are obtuse. As a result, the side shields 23 may reduce the magnetic field leakage, because the shield structure easily creates closure domains and has difficulty focusing the magnetic load.

In the structure described herein according to various embodiments, the magnetic field gradient is increased, and the SNR is raised by the increase in the effective magnetic induction rate of the trailing shield 22 directly above the main magnetic pole 21. Simultaneously, the angle members at the trailing end of the side shields 23 may reduce the magnetic field leakage because the structure has difficulty concentrating the magnetic load. By using this shield structure, improvement of the down-track magnetic field gradient and reduction in the magnetic field leakage generated from the angle members at the trailing end of the side shields are possible and have been confirmed by calculations based on a micromagnetics simulation.

The micromagnetics analysis in this simulation used a computational program for dynamic magnetic field analysis developed for analyzing the dynamically changing magnetic states of the magnetic pole and the shields of the recording head by solving the Landau-Lifshitz-Gilbert (LLG) equation. Because the memory size of the computer was limited, in the model, the proximity of the main magnetic pole of the actual recording head was modeled by partial calculations. A 5 nm cubic mesh was used to create the main magnetic pole and the shield shape in the recording head in a region where the width in the cross-track direction of the shield was 1950 nm, the height in the down-track direction was 1055 nm, and the depth was 700 nm.

FIG. 5 shows the conformal WAS structure as a representative example of the locations of the main magnetic pole and the shield of the recording head. In addition, Table 1 shows exemplary dimensions for this structure.

TABLE 1

Exemplary Dimensions for a Perpendicular Recording Magnetic Head

| | |
|---|---|
| Main Pole Width | 50 nm |
| Main Pole Length | 100 nm |
| Flare Length | 50 nm |
| Flare Angle | 45° |
| Trailing Gap (TG) | 25 nm |
| Side Gap (SG) | 50 nm |
| Side Shield Height (SSH) | 70 nm-200 nm |
| Leading Edge Gap (LEG) | 100 nm |
| Head to Soft Underlayer Distance | 37 nm |

Compared to the entire calculation region, the size of the main magnetic pole is small, and the sizes of the side shields and the trailing shield are sufficiently large in order to discuss the magnetic wall generated by the side shields or the trailing shield. Because the magnetic materials used in the shields and the main magnetic pole are the plurality of materials used in actual recording heads, but do not correspond to the plurality of materials in the current computational program, the shields and the main magnetic pole were modeled as a single material having the saturated magnetic flux density Bs=2.2 T. In addition, the distance from the ABS to the soft magnetic under layer (SUL) was set to 37 nm. The computation conditions were an amplitude of 0.12 AT and a cosine wave current at the frequency of 1 GHz as the excitation force for the coil; a damping constant of α=1.0; and a time step of Δt=0.2 ps until 3 ns. At the third period when the effects of the initial state have almost disappeared, the process for reversing the head magnetic field was evaluated. In addition, only the shapes were changed for the T-gap WAS structure or the shield structure, according to various embodiments. All of the calculation conditions for the materials and the magnetic field application were the same.

The verification results of this calculation were that the down-track magnetic field gradient was higher than that of the conformal WAS structure in the range of θ<~45° or equivalent to that of the T-gap WAS structure, and a reduction in the magnetic field leakage above about 1000 Oe was expected compared to T-gap WAS when θ>~20°. Thus, the reduction in the magnetic field leakage is expected because the shield structure as described herein according to various embodiments increases the effective magnetic induction rate, magnetic field gradient, and SNR, and simultaneously makes the concentration of magnetic loads difficult in the angle members at the trailing end of the side shields in the region of the angle θ, where 20°<θ<45°.

Figure 6:
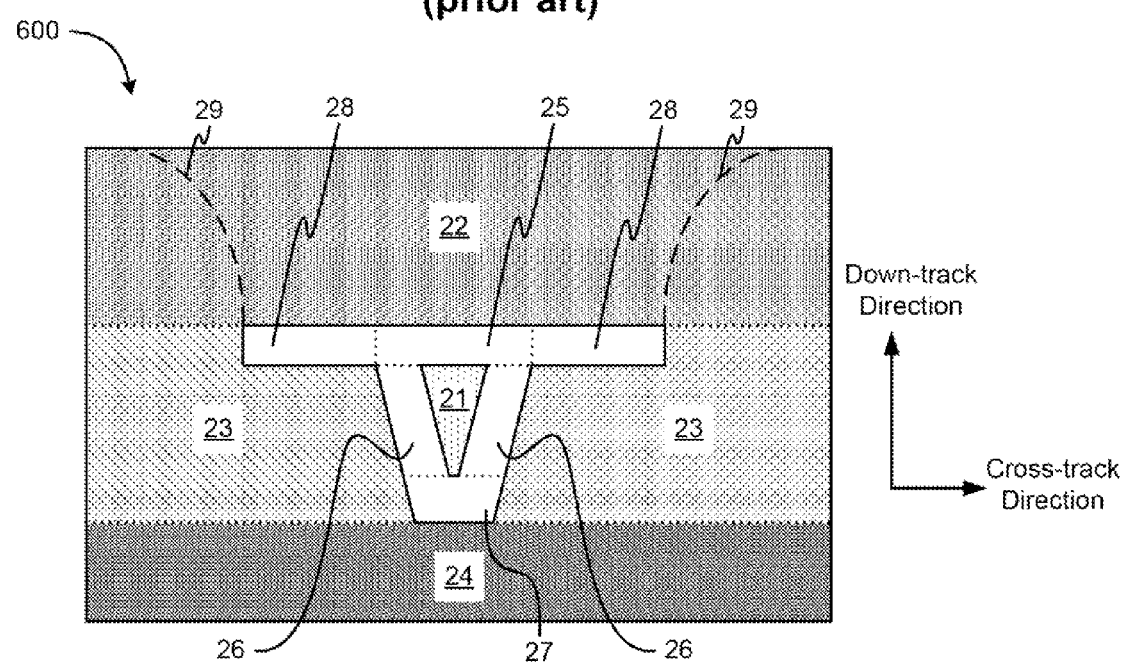
FIG. 6 shows the side shield shape of the T-gap WAS structure, according to the prior art.

According to embodiments of the shield structure described herein, the following two effects may be obtained simultaneously. 1) By widening the region where the magnetization of the trailing shield easily tilts, the effective magnetic induction rate increases compared to the conformal WAS structure shown in FIG. 5, and the magnetic field gradient and the SNR increase because of the same effects as in the T-gap WAS structure shown in FIG. 6. 2) By relaxing the angles of the angle members of the side shields, charge accumulation becomes difficult, and the ATI/FTI caused by the magnetic field leakage from the angle members at the trailing end of the side shields, which is a problem in the T-gap WAS structure shown in FIG. 6, is suppressed.

By using a magnetic head having this kind of shield structure, a highly reliable, compact, high-capacity magnetic recording device may be provided which has an improved. SNR, enables high recording densities, and has few incorrect erasures by magnetic field leakage of the magnetic head even when used over an extended period of time.

Figure 8:
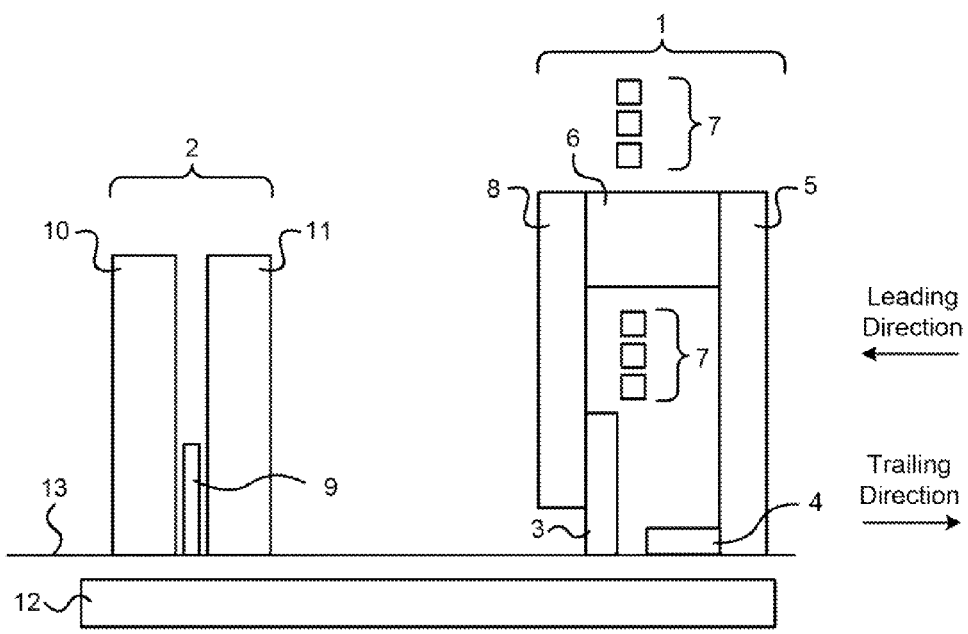
FIG. 8 shows a relationship between the magnetic head and the magnetic medium, according to one embodiment.

FIG. 8 shows a magnetic head for a HDD according to one embodiment. The magnetic head comprises a recording head 1 provided with a main magnetic pole and an auxiliary magnetic pole, and a playback head 2. The recording head 1 comprises a main magnetic pole 3, a shield 4, an auxiliary magnetic pole 5, a back gap 6, a coil 7, and a yoke 8. The playback head comprises a playback element 9, such as a current-in-plane giant magnetoresistive (CIP-GMR) element, a current-perpendicular-to-plane giant magnetoresistive (CPP-GMR) element, a tunneling magnetoresistive (TMR) element, etc., and has a lower playback shield 10 and an upper playback shield 11.

Figure 9:
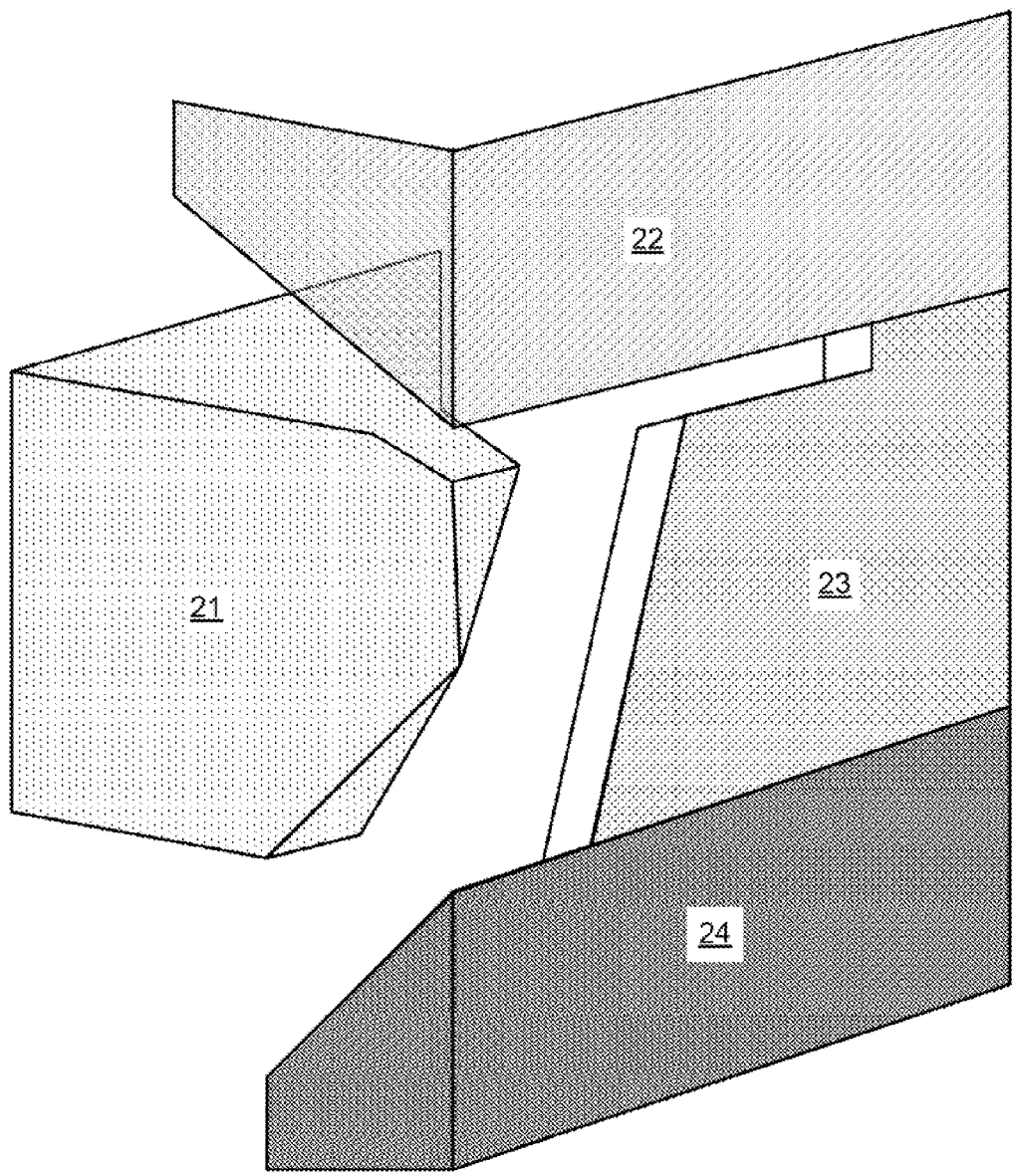
FIG. 9 shows a schematic view of a conventional magnetic head, according to the prior art.

FIG. 9 is a schematic view of a recording head, according to one embodiment. As shown in FIG. 9, in order to increase the magnetic field of the recording head, the main magnetic pole 21 may have a tapered pole structure which is inclined toward the media facing surface (such as the ABS) in each surface side, e.g., trailing side, leading side, and side shield sides. Taking into consideration magnetic recording which uses a skew angle, and the shape of the media facing surface of the main magnetic pole 21, the main pole structure appears as an inverted trapezoidal shape or an inverted triangular shape, in one approach.

According to one embodiment, shown in FIG. 10, a perpendicular recording magnetic head comprises a trailing shield 22 and a side shield 23 positioned on sides of the main magnetic pole 21. The shield shape has a TS gap 28 for separating the trailing shield 22 and the side shields 23, and the interval of the TS gap 28 between the trailing shield 22 and the side shields 23 narrows gradually farther away from the main magnetic pole 21 when viewed from the plane opposite the magnetic medium.

FIG. 11 shows a shield shape in which the interval between the trailing shield 22 and the side shield 23 of the TS gap 28 narrows gradually when moving away from the main magnetic pole 21, when viewed from the plane opposite the medium, according to one embodiment. The edge on the side shield 23 side of the TS gap 28 tilts in the angle (θ) in the trailing side direction of the magnetic head from the direction parallel to the track-width direction. However, the edges on the side shield 23 sides of the TS gap 28 and the edges of the side shields 23 on the two sides opposite the main magnetic pole 21 and sandwiching the side gap 26 are smoothly bonded together without a linear bond. Furthermore, an angle (Φ) between a tangent line C extending from an edge of the TS gap on a trailing shield side of the TS gap and a line parallel with the track-width direction is approximately 0° in one embodiment, and is generally in the range of about 0°<Φ<θ, according to various embodiments.

In the case as shown in FIG. 12, the angle θ of the intersection point M' of the tangent line A to the edge on the side shield 23 side of the TS gap 28 and the tangent line B to the edge of the side shield 23 on both sides, which sandwich the side gap 26 and are opposite the main magnetic pole 21, is on the line parallel to the track-width direction that includes the trailing end of the main magnetic pole 21. With the intersection point M' set as the fulcrum, the angle at which the edge on the side shield 23 side of the TS gap 28 tilts in the trailing side direction of the magnetic head from the direction parallel to the track-width direction is the angle θ.

The increase in the down-track magnetic field gradient and the reduction in the magnetic field leakage generated from the angle members at the trailing end of the side shields by adopting the shield structure described above was verified by calculations using a micromagnetics simulation.

In FIG. 13, the horizontal axis is the angle θ at which the edge on the side shield 23 side of the TS gap 28 tilts in the trailing side direction of the magnetic head from the parallel direction in the track-width direction. The vertical axis is the magnetic field gradient in the down-track direction of the magnetic field of the head. Y-gap WAS in the figure is the shield structure as described above. When θ=0°, the structure is the T-gap WAS structure shown in FIG. 6. The down-track magnetic field gradient is estimated to be about 240 Oe/nm. Because the down-track magnetic field gradient of the conformal WAS structure shown in FIG. 5 is 228 Oe/nm, the T-gap WAS structure, in which the magnetic wall generated at the trailing shield 23 is far from the magnetic pole, exhibits an increase in the down-track magnetic field gradient in region R(IMF). When the angle θ from the T-gap WAS structure (θ=0°) increases, the structure approaches the conformal WAS structure. In the range of θ<~45°, a down-track magnetic field gradient is obtained which is greater than that of the conformal WAS structure or equal to that of the T-gap WAS structure.

In FIG. 14, the horizontal axis is the angle θ at which the edge of the side shield 23 side of the TS gap 28 tilts in the trailing side direction of the magnetic head from the direction parallel to the track-width direction. The vertical axis is the intensity of the magnetic field leakage (ATI/FTI field) generated from the angle members at the trailing end of the side shields 23. The magnetic field leakage from the side shields 23 of the conformal WAS structure is about 2000 Oe, but a large magnetic field leakage exceeding 3500 Oe is generated by the T-gap WAS structure. This indicates that in the T-gap WAS structure, closure domains are difficult to produce in the side shields, and a large magnetic field leakage is generated by the concentration of the magnetic load because the angles created by the edges of the side shields 23, which sandwich the side gap 26 and are opposite the main magnetic pole 21, and the edges on the trailing end of the side shields 23 approach right angles. One objective of the shield structure (Y-gap WAS) as described above is to relax the angles produced by the edges of the side shields 23 that sandwich the side gap 26 and are opposite the main magnetic pole 21 and the edges on the trailing end of the side shields 23 to facilitate the creation of closure domains. The edge on the side shield 23 side of the TS gap 28 tilts in the trailing side direction of the magnetic head at an angle of θ from the direction parallel to the track-width direction. Compared to the T-gap WAS, when θ>~20°, a reduction in the magnetic field leakage above about 1000 Oe is expected in region R(RMF).

Based on the charts shown in FIGS. 13-14, a structure according to one embodiment may be expected to increase the magnetic field gradient and the SNR by increasing the effective magnetic induction rate in the angle θ region of 20°≤θ≤45° and to simultaneously reduce the magnetic field leakage because the angle members at the trailing end of the side shields 23 are structures which have difficulty concentrating a magnetic load. In particular, while a magnetic field gradient equal to that of the T-gap WAS is maintained, magnetic field leakage nearly identical to that of a conformal WAS structure results in the angle θ region of 30°≤θ≤40°, which is considered the angle region in which the above two advantages often appear with the shield structure as described herein according to various embodiments.

Figure 15:
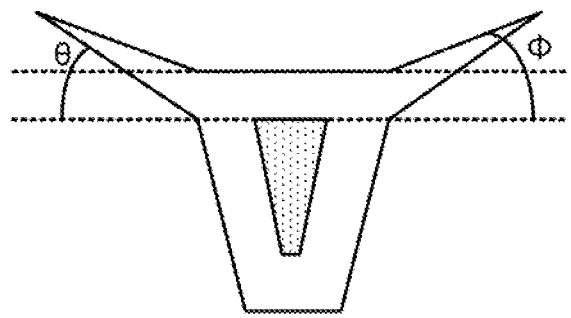
FIG. 15 shows a shield structure of a magnetic head, according to one embodiment.

FIG. 15 shows a shield structure according to another embodiment. Similar to the shield structure described previously, e.g., in FIGS. 10-12, as shown in FIG. 15, the shield shape is formed so that the interval between the trailing shield 22 and the side shield 24 viewed from the plane opposite the medium of the TS gap 28 narrows gradually when moving away from the main magnetic pole 21. The edge on the trailing shield 22 side of the TS gap 28 tilts in the trailing side direction of the magnetic head in the angle (Φ) from the direction parallel to the track-width direction. The edge on the side shield 23 side of the TS gap 28 tilts in the trailing side direction of the magnetic head in the angle (θ) from the direction parallel to the track-width direction. The relationship between angle Φ and angle θ is that Φ<θ. In addition, the width of the edge of the trailing shield 22 parallel to the track-width direction opposite the trailing end of the main magnetic pole 21 may be sufficiently wider than the width of the edge on the trailing side of the main magnetic pole 21 in some approaches. One objective is to widen the region in which the magnetization easily tilts and improve the effective magnetic induction rate. This differs from the perpendicular magnetic recording write head having a trailing shield with a notch.

Figure 16:
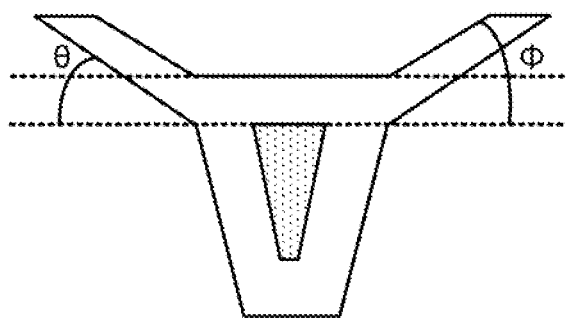
FIG. 16 shows a shield structure of a derivative structure of a magnetic head, according to one embodiment.
Figure 17:
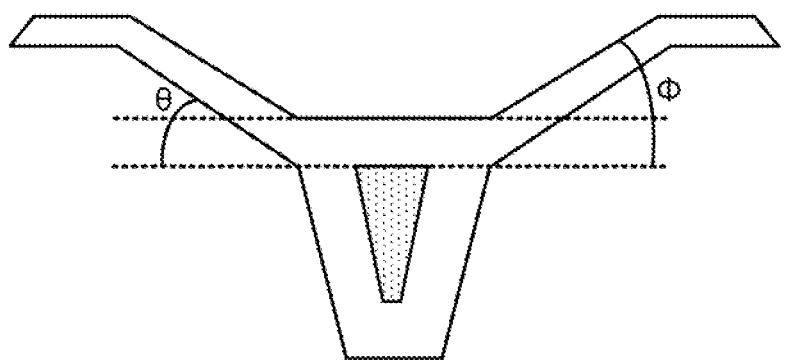
FIG. 17 shows a shield structure of a derivative structure of a magnetic head, according to one embodiment.

FIGS. 16-17 show modified shield structures similar to that shown in FIG. 15. In these embodiments, the TS gap 28 has a finite length in the track-width direction when viewed from the plane opposite the medium. In one embodiment, the TS gap may be characterized in having a shape defined by an angle (Φ) between a tangent line extending from an edge of each of the TS gaps on a trailing shield side of the TS gap and a line parallel with the track-width direction. In such an embodiment, the angle Φ is approximately equal to the angle θ, as shown particularly in FIG. 16. Moreover, the TS Gap 28 may be non-planar in shape, as shown particularly in FIG. 17. The trailing shield 22 and the side shields 23 are connected outside of the TS gap 28 in the track-width direction when viewed from the main magnetic pole 21. The edge on the trailing shield 22 side of the TS gap 28 tilts in the trailing side direction of the magnetic head in the angle (Φ) from the direction parallel to the track-width direction. The edge on the side shield 23 side of the TS gap 28 tilts in the trailing side direction of the magnetic head in the angle (θ) from the direction parallel to the track-width direction. The relationship between angle Φ and angle θ is Φ=θ. The shape has a width of the edge of the trailing shield 22 parallel to the track-width direction opposite the trailing end of the main magnetic pole 21 which is sufficiently wider than the width of the edge on the trailing side of the main magnetic pole 21.

Concerning the increase in the down-track magnetic field gradient and the reduction in the magnetic field leakage generated at the angle members at the trailing end of the side shields by adopting the shield structure shown in FIGS. 15-17, according to one embodiment, the increase in the effective magnetic induction rate and the reduction in magnetic field leakage may be expected in the angle θ region of 5°≤θ≤60°, similar to when the shield structure shown in FIGS. 10-12 is used, based on the condition of Φ≤θ between angle (Φ) and angle (θ).

According to another embodiment, the increase in the effective magnetic induction rate and the reduction in magnetic field leakage may be expected in the angle θ region of 20°≤θ≤45°, similar to when the shield structure shown in FIGS. 10-12 is used, based on the condition of Φ≤θ between angle (Φ) and angle (θ).

Similarly, in still yet another embodiment, the result is that while a magnetic field gradient equivalent to that of the T-gap WAS is maintained, magnetic field leakage approximately equals that of the conformal WAS structure in the angle θ region of 30°≤θ≤40°, which is considered to be the angle region in which the two advantages as described herein often appear due to the use of the shield structure described herein according to various embodiments.

Referring now to FIGS. 18A-18P, a process flow of the method for forming a shield structure is shown according to one embodiment. As shown in FIG. 18A, a magnetic body 31 is plated as a stopper film on an inorganic insulating substrate 30. The magnetic body 31 may comprise FeNiCo, FeCo, FeNi, CoNi, NiCr, or any other suitable material as would be known to one of skill in the art. As shown in FIG. 18B, insulating layer 32 for an embedded groove of the plating for the main magnetic pole may be vapor deposited by sputtering on the magnetic body 31. Of course, any suitable material may be used for the insulating layer 32 as would be known to one of skill in the art, such as alumina ($Al_2O_3$), $SiO_2$, $Ta_2O_5$, MgO, etc. For example, any non-magnetic oxide material may be used, as would be understood by one of skill in the art. As shown in FIG. 18C, a hard film 33 may be vapor deposited, such as via sputtering, on the insulating layer 32. The hard film may comprise Ni, Cr, Ta, NiCr, NiTa, or any other suitable material, alloy, or combination thereof as would be known to one of skill in the art.

As shown in FIG. 18D, etching, milling, etc., such as reactive ion etching (RIE) may be used to form a groove for the main magnetic pole in the insulating layer 32. As shown in FIG. 18E, a paramagnetic film 34 for the side gaps is deposited, such as via vapor deposition by sputtering or some other suitable technique. Any suitable material that is a non-magnetic metal may be used for the paramagnetic film 34 as would be known to one of skill in the art, such as Ru, Pt, Cr, NiCr (non-magnetic), an alloy thereof, etc. Next, as shown in FIG. 18F, the magnetic body 35 for the main magnetic pole is formed, such as via plating or some other suitable technique. The magnetic body 35 may comprise FeNiCo, FeCo, FeNi, CoNi, or any other suitable material as would be known to one of skill in the art.

As shown in FIG. 18G, the vapor deposited magnetic body 35, hard film 33, and paramagnetic film 34 are planarized, such as via chemical mechanical polishing (CMP) or any other suitable technique to the positions of the trailing edges of the side shields. The insulating layer 32 is removed, such as via wet etching or any other suitable technique, as shown in FIG. 18H. Next, as shown in FIG. 18I, a deposition technique, such as electroplating, is used to plate a magnetic body 31 and form the shield. The magnetic body 31 may comprise FeNiCo, FeCo, FeNi, or any other suitable material as would be known to one of skill in the art. As shown in FIG. 18J, planarization is conducted, such as via CMP, to the positions of the trailing edges of the side shields. Next, as shown in FIG. 18K, the finishing mask may be the resist 36, or some other suitable material, such as diamond-like carbon (DLC), at the paramagnetic film position of the side gap. Even if an offset is produced in the position of the finishing mask, the mask may be formed in the paramagnetic film 34 of the side gap. As shown in FIG. 18L, the main magnetic pole is milled to the position of the trailing edge. Next, the resist or DLC 36 of the processing mask is removed. As shown in FIG. 18M, the paramagnetic film 34 of the side gap is removed to the trailing edge position of the main magnetic pole, such as via oxygen ashing or any other suitable technique. As shown in FIG. 18N, the side shield sides of the TS gap are formed, such as via light milling. The angle (θ) formed by the edge on the side shield side tilted in the trailing side direction of the magnetic head from the direction parallel to the track-width direction is adjusted by the incident angle of the light milling. Next, a paramagnetic film 37 for the trailing gap is vapor deposited by sputtering. The paramagnetic film 37 may comprise Ru or any other suitable material as would be known to one of skill in the art. As shown in FIG. 18O, the paramagnetic film 37 is planarized, such as via CMP, to the position of the trailing edge of the side shields. After the seed layer is deposited, such as via vapor deposition, on top, the magnetic body 38 is formed, such as via plating, as shown in FIG. 18P. The magnetic body 38 may comprise any suitable material, such as those described in regard to the magnetic body 31, above, any other as would be known by one of skill in the art. Thus, the shield structure is formed according to one embodiment.

Of course, other materials and/or sequences of process steps, and other etching, milling, forming, plating, planarizing, and/or depositing techniques may be used in place of or in conjunction with those described above, as would be known to one of skill in the art upon reading the present descriptions.

Figure 19:
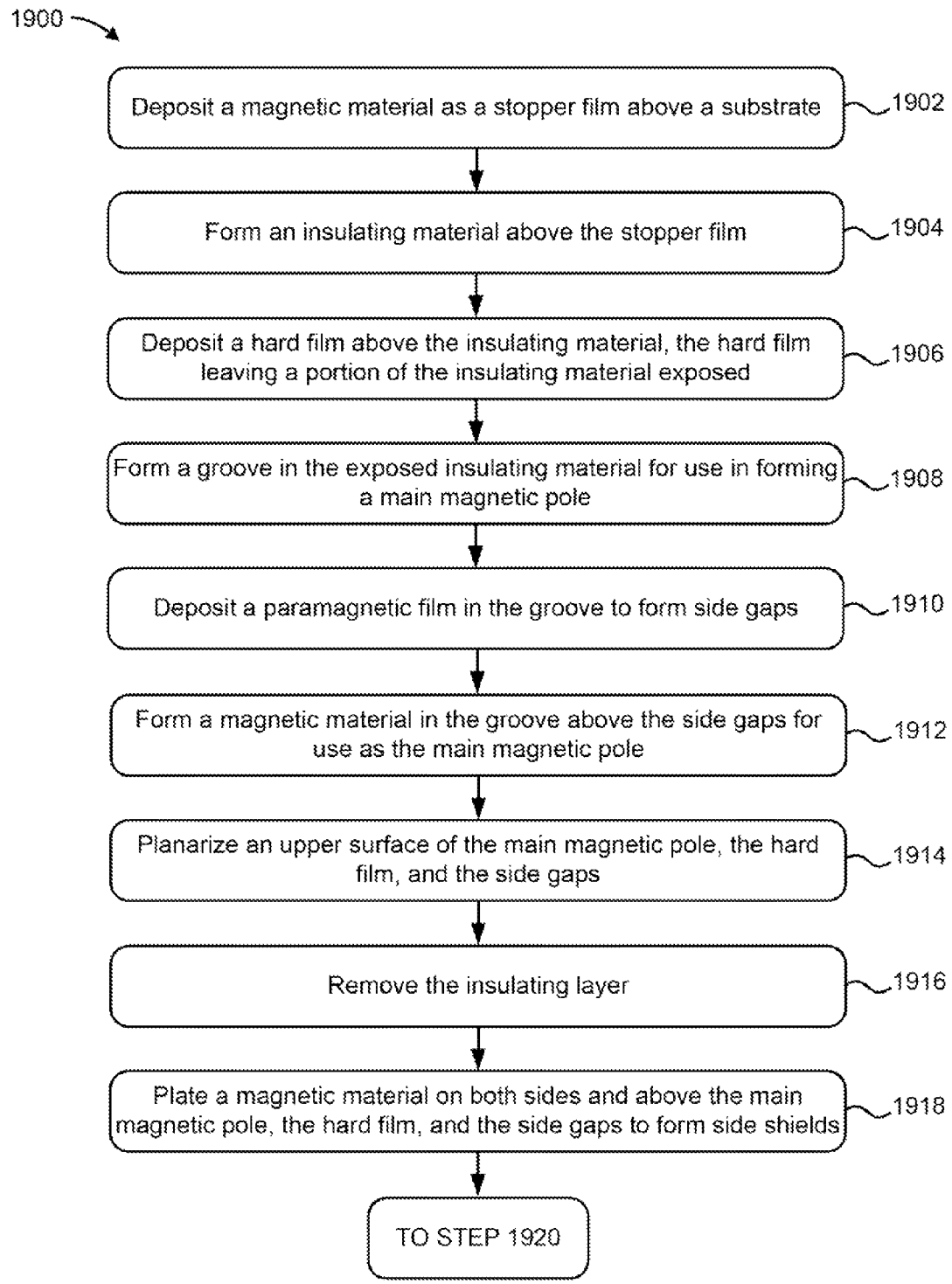
FIG. 19 shows a flowchart of a method, according to one embodiment.
Figure 19:
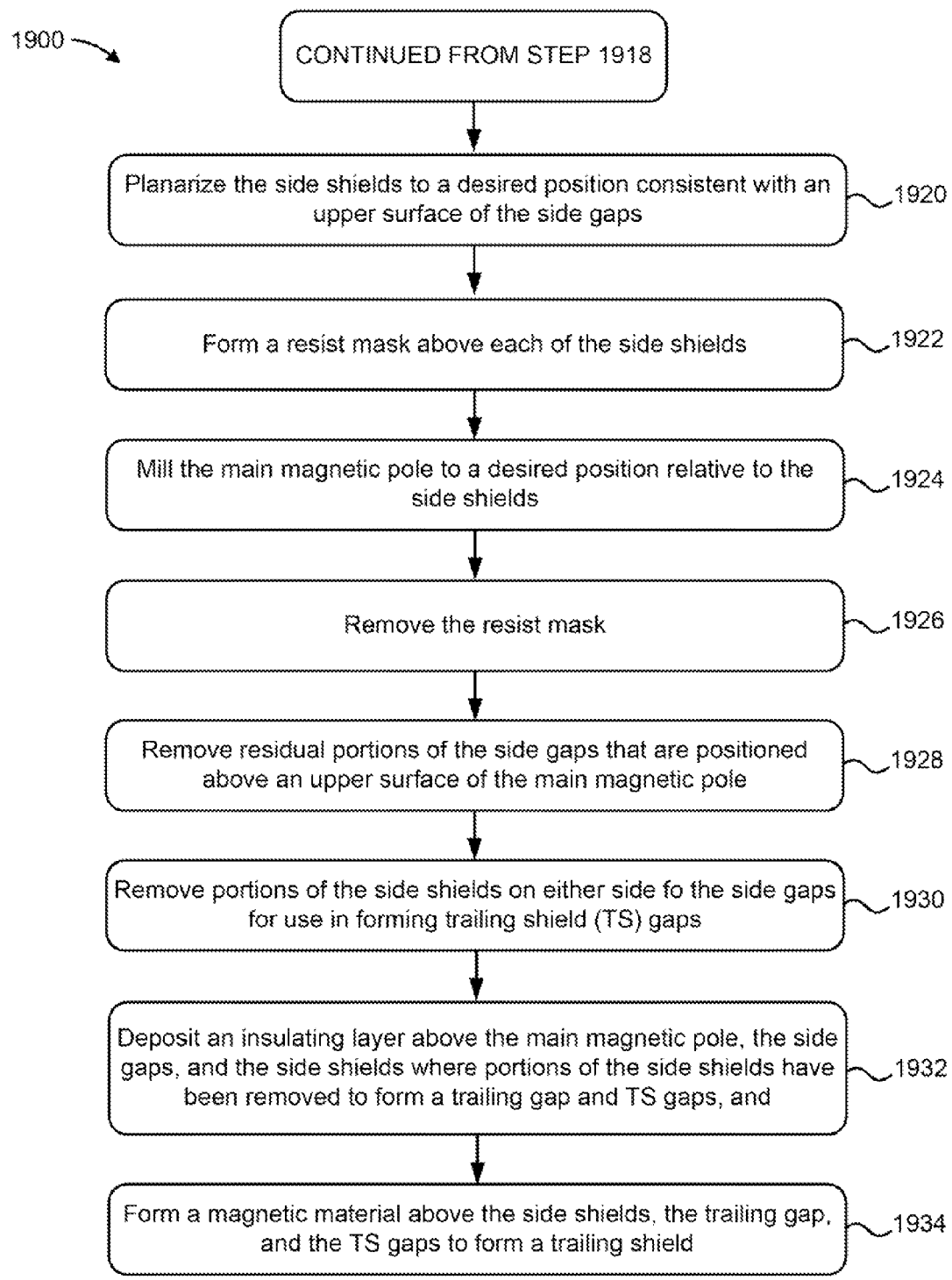

Now referring to FIG. 19, a method 1900 for manufacturing a magnetic recording head having a shield structure as described herein is described, according to one embodiment. The method may be carried out in any desired environment, and may include more or less operations than those described in FIG. 19, according to various embodiments. Furthermore, the method may include any approaches and/or embodiments as described herein in FIGS. 1-18P, as would be understood by one of skill in the art upon reading the present descriptions.

As shown in FIG. 19, in one approach, the method 1900 includes a first operation 1902 where a magnetic material is deposited as a stopper film above a substrate, according to one embodiment.

Moreover, the method 1900 may additionally include a subsequent operation 1904, where an insulating material is formed above the stopper film, in some approaches.

Next, the method 1900 may further include operation 1906 where a hard film is deposited above the insulating material such as to leave a portion of the insulating material exposed, in one embodiment.

Additionally, method 1900 may include operation 1908 where a groove is formed in the exposed insulating material, in some approaches. The groove may be particularly useful in forming a main magnetic pole, according to various embodiments.

Subsequently, in operation 1910 the method 1900 may continue with a paramagnetic film being deposited in the groove to form side gaps, in one approach.

Moreover, the method 1900, in some embodiments, includes operation 1912 where a magnetic material is formed in the groove, above the side gaps, for use as a main magnetic pole.

Furthermore, method 1900 may include operation 1914 where an upper surface of the main magnetic pole, the hard film, and the side gaps is planarized, in another approach.

In various embodiments, method 1900 may also include operation 1916 where the insulating layer is removed.

Method 1900 may further include operation 1918, in which, according to one embodiment, a magnetic material is plated on both sides of and above the main magnetic pole, the hard film, and the side gaps in order to form side shields.

In another embodiment, method 1900 may also include operation 1920 where the side shields are planarized to a desired position consistent with an upper surface of the side gaps.

In various approaches, method 1900 further includes operation 1922 where a resist mask is formed above each of the side shields.

Method 1900 may also, in one embodiment, include operation 1924 where the main magnetic pole is milled to a desired position relative to the side shields.

In operation 1926, method 1900 may continue with the resist mask being removed, according to one approach.

Subsequently, method 1900 may include operation 1928 where the residual portions of the side gaps, positioned above the upper surface of the main magnetic pole, are removed, according to various embodiments.

Method 1900 may further include operation 1930 where portions of the side shields on either side of the side gaps are removed, in one embodiment. Notably, removing these side shield portions is advantageous to forming trailing shield (TS) gaps.

Additionally, method 1900 may include operation 1932 where an insulating layer is deposited above the main magnetic pole, the side gaps, and the side shields according to one embodiment. Furthermore according to such an embodiment, the insulating layer is deposited where portions of the side shields have been removed to form the TS gaps and a trailing gap.

Subsequently, in operation 1934 of method 1900, a magnetic material is formed above the side shields, the trailing gap, and the TS gaps to form a trailing shield, according to various approaches.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a main magnetic pole having a leading edge positioned at a leading-most point of the main magnetic pole in a down-track direction and a trailing edge positioned at a trailing-most point of the main magnetic pole in the down-track direction;
a trailing shield positioned on a trailing side of the main magnetic pole;
a trailing gap positioned between the trailing shield and the main magnetic pole;
side shields positioned on either side of the main magnetic pole in a cross-track direction;
side gaps positioned between the side shields and the main magnetic pole on either side of the main magnetic pole in the cross-track direction, wherein the side gaps each have width in the cross-track direction that is constant along an entire length of the main pole in the down-track direction from the leading edge to the trailing edge thereof;

a leading gap positioned on a leading side of the main magnetic pole that directly contacts the side gaps; and trailing shield (TS) gaps positioned on either side of the main magnetic pole in the cross-track direction between the trailing shield and the side shields, wherein the TS gaps extend beyond the side gaps in a direction parallel to the cross-track direction, wherein an angle (θ) between a tangent line consistent with an edge of the TS gap on a side shield side of the TS gap near the trailing shield and a line parallel to the track-width direction is in a range of 5°<θ<60°.

2. The magnetic head as recited in claim 1, wherein a width of each of the TS gaps in a direction perpendicular to the cross-track direction is narrower at a point away from the main magnetic pole than at a point near the main magnetic pole, and wherein each of the TS gaps narrow gradually from the point near the main magnetic pole toward the point away from the main magnetic pole.

3. The magnetic head as recited in claim 1, wherein an angle (θ) between a tangent line consistent with an edge of the TS gap on a side shield side of the TS gap near the trailing shield and a line parallel to the track-width direction is in a range of 20°≤θ≤45°.

4. The magnetic head as recited in claim 3, wherein the angle (θ) is in a range of 30°≤θ≤40°.

5. The magnetic head as recited in claim 3, wherein an angle (Φ) between a tangent line extending from an edge of the TS gap on a trailing shield side of the TS gap and a line parallel with the track-width direction is in a range of 0°<Φ<θ.

6. The magnetic head as recited in claim 3, wherein an angle (Φ) between a tangent line extending from an edge of the TS gap on a trailing shield side of the TS gap and a line parallel with the track-width direction is about 0°.

7. The magnetic head as recited in claim 1, wherein a width of a linear edge of the trailing shield in a direction parallel to the track-width direction nearest to a trailing edge of the main magnetic pole is wider than a width of the trailing edge of the main magnetic pole.

8. The magnetic head as recited in claim 1, further comprising:
a leading shield positioned on the leading side of the main magnetic pole, wherein the leading gap is positioned between the leading shield and the leading edge of the main magnetic pole.

9. The magnetic head as recited in claim 8, wherein the leading shield comprises at least one of: FeNiCo, FeCo, FeNi, CoNi, and NiCr, and wherein the leading gap comprises at least one of: alumina and MgO.

10. The magnetic head as recited in claim 1, wherein the side shields comprise at least one of: FeNiCo, FeCo, FeNi, CoNi, and NiCr, and wherein the side gaps comprise at least one of alumina and MgO.

11. The magnetic head as recited in claim 1, wherein the trailing shield comprises at least one of: FeNiCo, FeCo, FeNi, CoNi, and NiCr, and wherein the trailing gap comprises Ru.

12. The magnetic head as recited in claim 1, wherein the main magnetic pole comprises at least one of: FeNiCo, FeCo, FeNi, and CoNi.

13. The magnetic head as recited in claim 1, wherein an angle (Φ) between a tangent line extending from an edge of the TS gap on a trailing shield side of the TS gap and a line parallel with the track-width direction is in a range of 0°<Φ≤θ.

14. The magnetic head as recited in claim 13, wherein the angle (Φ) is about equal to θ.

15. The magnetic head as recited in claim 14, wherein each of the TS gaps is non-planar in shape.

16. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

17. A method, comprising:
depositing a magnetic material as a stopper film above a substrate;
forming an insulating material above the stopper film;
depositing a hard film above the insulating material, the hard film leaving a portion of the insulating material exposed;
forming a groove in the exposed insulating material for use in forming a main magnetic pole;
depositing a paramagnetic film in the groove to form side gaps and a leading gap, wherein the leading gap directly contacts the side gaps;
forming a magnetic material in the groove above the leading gap and side gaps for use as the main magnetic pole having a leading edge positioned at a leading-most point of the main magnetic pole in a down-track direction and a trailing edge positioned at a trailing-most point of the main magnetic pole in the down-track direction;
planarizing an upper surface of the main magnetic pole, the hard film, and the side gaps;
removing the insulating layer;
plating a magnetic material on sides and above the main magnetic pole, the hard film, and the side gaps to form side shields;
planarizing the side shields to a desired position consistent with an upper surface of the side gaps;
forming a resist mask above each of the side shields;
milling the main magnetic pole to a desired position relative to the side shields;
removing the resist mask;
removing residual portions of the side gaps that are positioned above an upper surface of the main magnetic pole;
removing portions of the side shields on either side of the side gaps for use in forming trailing shield (TS) gaps;
depositing an insulating layer above the main magnetic pole, the side gaps, and the side shields where the portions of the side shields have been removed to form a trailing gap and the TS gaps; and
forming a magnetic material above the side shields, the trailing gap, and the TS gaps to form a trailing shield,
wherein the side gaps each have width in a cross-track direction that is constant along an entire length of the main pole in the down-track direction from the leading edge to the trailing edge thereof, and
wherein an angle (θ) between a tangent line consistent with an edge of the TS gap on a side shield side of the TS gap near the trailing shield and a line parallel to the track-width direction is in a range of 5°<θ<60°.

18. The method as recited in claim 17, wherein the insulating material comprises at least one of: alumina and MgO.

19. The method as recited in claim 17, wherein the paramagnetic film comprises Ru.

20. The method as recited in claim 17, wherein the magnetic material comprises at least one of: FeNiCo, FeCo, FeNi, CoNi, NiCr.

* * * * *

UNITED STATES PATENT AND TRADEMARK OFFICE
CERTIFICATE OF CORRECTION

| | | |
|---|---|---|
| PATENT NO. | : 8,830,623 B2 | Page 1 of 1 |
| APPLICATION NO. | : 13/330570 | |
| DATED | : September 9, 2014 | |
| INVENTOR(S) | : Hamasaki et al. | |

It is certified that error appears in the above-identified patent and that said Letters Patent is hereby corrected as shown below:

In the specification:

col. 13, line 31 replace "above, any" with -- above, or any --.

Signed and Sealed this
Third Day of March, 2015

Michelle K. Lee
*Deputy Director of the United States Patent and Trademark Office*